United States Patent Office 3,016,733
Patented Jan. 16, 1962

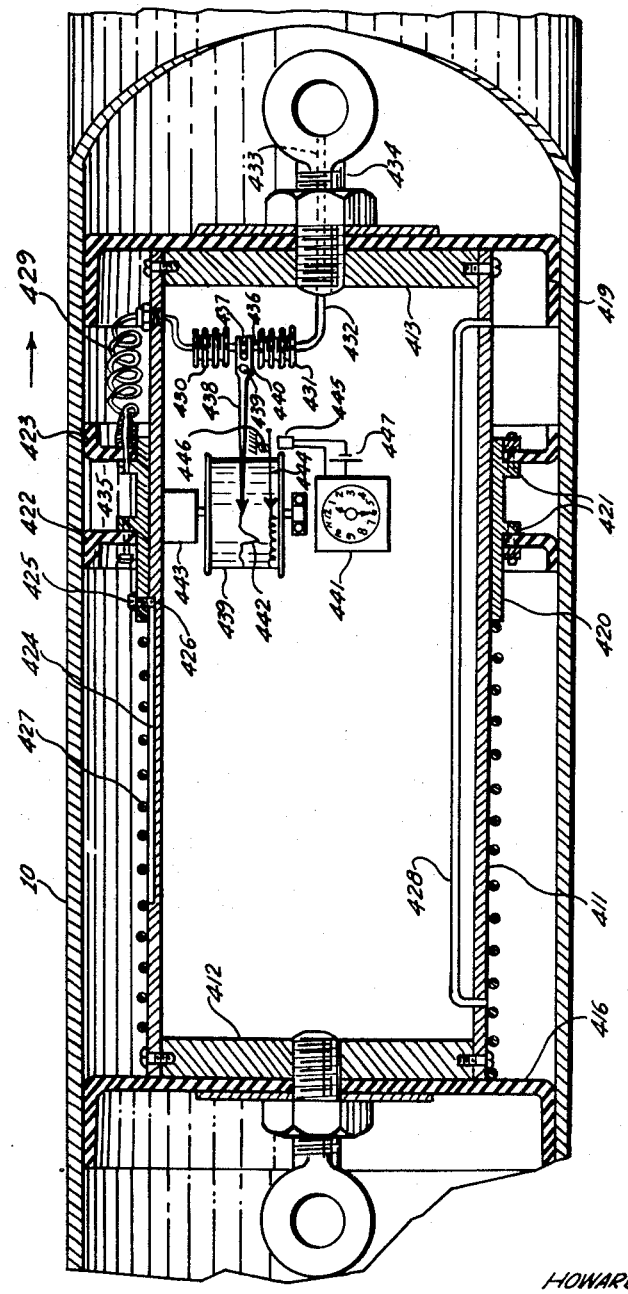

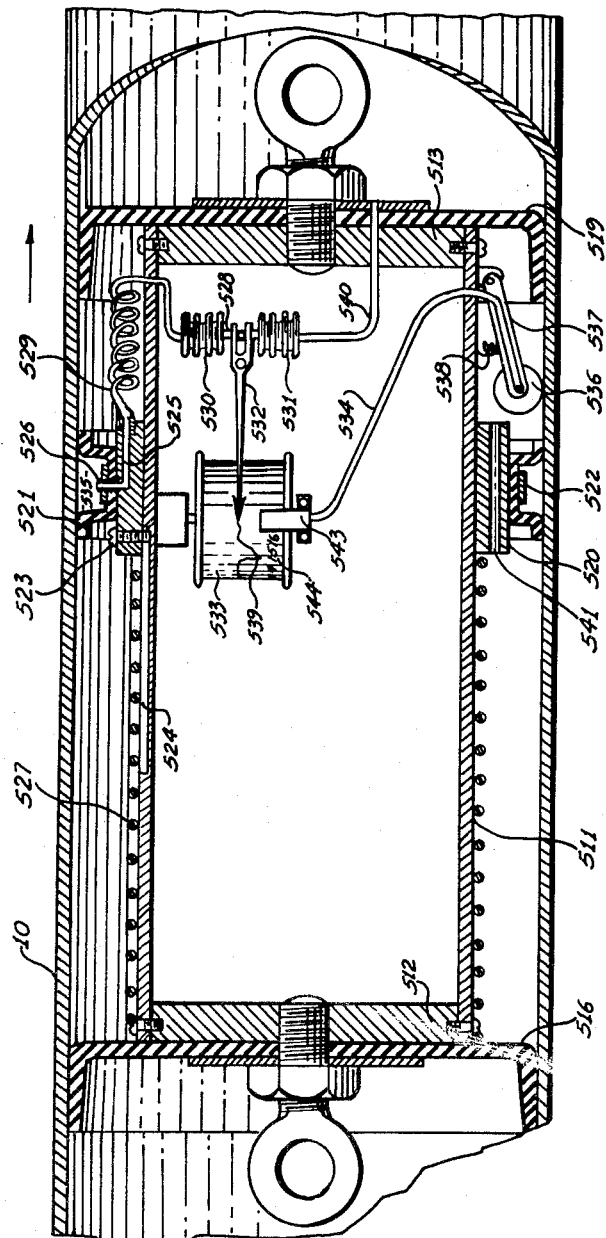

3,016,733
PIPELINE LEAK SURVEYING
Howard J. En Dean, Fox Chapel, Pa., John Delbert Jones, Tulsa, Okla., and Edward Topanelian, Jr., Pittsburgh, Pa., assignors to Gulf Research & Development Company, Pittsburgh, Pa., a corporation of Delaware
Original application June 28, 1956, Ser. No. 594,482. Divided and this application Oct. 30, 1959, Ser. No. 849,956
3 Claims. (Cl. 73—40.5)

This invention concerns apparatus for making surveys in pipelines, and in particular concerns apparatus for locating leaks in a transportation pipeline to which access may be had to the inside only.

It is well known that pipelines occasionally develop leaks which are often times difficult to locate, particularly if the leak is small. Under certain conditions if the leak is of sufficient magnitude, it may be found by inspection of the surface of the ground as is customarily done by a pipeline walker or by aerial surveys. In general the prior methods of locating leaks are expensive and have the disadvantage of being incapable of detecting small leaks until the amount of fluid which has leaked out of the pipeline becomes large enough to be recognizable by visual observation. Prior to visual recognition such small leaks may nevertheless cause expensive damages to crops, water supplies, etc., in addition to the loss of accumulated amounts of the transported material. Where pipelines are laid in tile, leaks may persist for long periods without detection and the location of surface evidence of the leak may not correspond with the location of the actual pipeline leak. Particularly in the case of pipelines for carrying oil, the oil is often corrosive and a pipeline otherwise in good condition may develop small leaks due to corrosion pitting. In the case of pipelines which carry refined petroleum products such as gasoline, the fire and explosion hazards which may result from a small leak are obvious and illustrate the necessity of promptly locating even small leaks in pipelines of this character. In this invention the pipeline is surveyed for leaks by transmitting through the pipeline an instrumentality capable of measuring a parameter which serves to indicate the presence and location of leaks.

In one embodiment of this invention wherein it is desired to locate leaks in a pipeline there is contemplated apparatus whereby a small segment of pipeline is isolated and any failure of the isolated segment to maintain pressure is recorded. The apparatus which isolates a segment of the pipeline moves progressively through the pipe from one end to the other, and during its traverse it records the pressure in the region of isolation. This embodiment of the invention comprises a carrier which may be inserted in a pipeline and which has flexible self-energized packers or flexible flanged washers which seal against the pipeline wall, and which carries a recording chart on which there is automatically recorded pressure variations of the fluid in the isolated segment of the pipeline lying between the packers.

In the present embodiment of this invention the isolating packers are slidably mounted on the apparatus so that when a leak is encountered the isolating packers are temporarily retarded thereby giving increased sensitivity to the recording of small leaks.

This application is a division of copending application Serial Number 594,482, filed June 28, 1956, now Patent No. 2,951,362 and which is assigned to the same assignee as this application.

The invention will be described in this specification of which the drawings form a part, and in which:

FIGURE 1 shows a diagrammatical view of an embodiment of this invention for the detection and recording of small leaks in a pipeline and simultaneously recording the traverse time and;

FIGURE 2 shows a diagrammatical view of an embodiment of this invention useful for detecting small leaks in a pipeline and recording their occurrence as a function of traverse distance.

Referring to FIGURE 1 there is shown a diagrammatical cross-section of an embodiment of this invention having improved sensitivity for the detection of leaks. A cylindrical carrier 411 is sealed at the ends by end plates 412 and 413 and also carries at each end a flexible cup-shaped packer 416 and 419. An annular sliding carriage 420 is adapted to slide easily on the outside of the cylindrical case 411. The carriage 420 is equipped with spaced annular flanges 421 to which are attached annular packers 422 and 423. The packers 422 and 423 are clamped to the flanges 421 and sealed thereto so that the space 435 between the packers is effectively isolated. A groove 424 is cut part way through the wall of the carrier 411. A screw 425 is threaded into the carriage 420 and is reduced in diameter at its lower end to form a pin 426 which slides in the groove 424 thereby preventing rotation of the carriage 420. The limited length of the groove 424 allows a limited longitudinal sliding motion of the carriage 420. A helical compression spring 427 urges the carriage 420 into the forwardmost position on the carrier 411 as is permitted by the slot 424.

When the device of FIGURE 1 traverses the pipeline and a leak is encountered in the region 435 a pressure drop will occur in the annular space 435. The pressure drop due to the leak causes the packers 422 and 423 to firmly press against the wall of the pipe 10. In this way reduction in pressure due to a leak in the region 435 causes the carriage to stick to the pipe, and since it is slidably mounted on the carrier 411, the carrier 411 may move forward while the carriage 420 remains stuck to the location of the leak until the pin 426 reaches the rear end of the groove 424. The carriage 420 then again moves forward with the carrier 411, and gradually the carriage 420 returns to its normal position on the carrier 411 through the action of the spring 427. A bypass tube 428 connects the two annular spaces around the carrier 411 between the packers 416 and 419 respectively before and behind the carriage 420, so that the latter may move longitudinally on the carrier 411. The forward packer and flange 421 are drilled and the space 435 communicates by means of a flexible hose 429 with a bellows 430 inside of the carrier 411. A similar bellows 431 communicates by means of pipe 432 with a drilled hole 433 in the forward bolt 434 so as to connect bellows 431 with the pipeline fluid ahead of the device. The bellows 430 and 431 are mechanically interconnected by a rigid linkage 436 which carries a pin 437. A pen arm 438 pivoted at 439 has a fork 440 which engages the pin 437. Any pressure difference between the isolated region 435 and the region in the pipeline ahead of the carrier will effect motion of the pen arm 438 and be recorded. The pen 438 records on a drum 439 carrying a record chart and driven by a spring motor 443.

In the operation of the device in FIGURE 1 when the region 435 between the two packers 422 and 423 includes a leak in the pipeline 10 the carriage 420 sticks to the wall of the pipe, whereas the carriage 411 continues its forward motion. Because of the fact that the carrier 420 tarries at the leak, the drop in pressure is accentuated with the result that the record will show at 442 a substantial pressure drop at the time the leak is encountered. As soon as the carriage 420 reaches its rear limit of travel with respect to the carrier 411, the carriage is pushed past the point of leak and the pressure in region 435 gradually recovers to its normal value. Subsequently the spring 427 urges the carriage back into its normal forward position (as shown in FIGURE 1). Inasmuch as the apparatus may traverse the pipeline at the rate of several feet per second, the total time during which the leak is in communication with the region 435 is substantially increased. Accordingly, the embodiment of FIGURE 1 is particularly adapted to detect and record leaks of small magnitude.

In order to determine the location corresponding to recorded leaks a clock 441 is provided having electric contacts which close at accurate intervals in the well-known manner of a chronometer. A chronograph pen 444 having an electromagnet 445 and return spring 446 records on the chart 439 along side of the pen 438. A battery 447 is connected in the series circuit comprising the chronometer contacts and the pen-deflecting magnet 445 so that at accurately-known intervals the pen 444 marks a pip which records the passage of the time interval. In this manner there is obtained the pressure-difference record and also an elapsed-time record so that correlation of these parameters is recorded. From this record the pipeline location corresponding to any desired point on the record may easily be calculated, and the position of an indicated leak is determinable from the time that the mark is made on the chart compared to the total time of traverse.

FIGURE 2 shows in diagrammatical cross-section a further embodiment of this invention in which the sensitivity is still further improved by the use of an annular isolating member whose total volume may be made small. The apparatus of FIGURE 2 comprises a cylindrical carrier 511 with sealed end plates 512 and 513 and having packers 516 and 519 as in the previously described embodiments. A carriage 520 in the form of a ring freely sliding on the outside of the carrier 511 carries a flexible annular cup 521 having an outwardly open U-shaped section. The cup 521 is held on the ring 520 by means of a strap 522 on its inner base as shown, the strap 522 being united at its ends by a toggle latch (not shown). The carriage 520 has a stop screw 523 whose lower end rides in slot 524 permitting the carriage limited longitudinal motion on the carrier 511. A spring 527 urges the carriage into its maximum forward position. The ring-shaped carriage 520 is drilled at 525 and has a nipple 526 which extends through a hole in the cup 521 and the strap 522. A flexible hose 529 connects with the hole 525 and transmits the pressure from the region 535 inside the cup to the bellows 530. A similar bellows 531 connects to the pipeline ahead of the carrier by means of tube 540 which passes through the forward end of the carrier. A linkage 528 connects the opposing ends of the bellows and carries a pin engaging the fork of the recording pen 532. Inasmuch as the annular space 535 may be made quite small, even a small leak in the pipeline will effect a substantial reduction in pressure in the region 535 causing the cup to adhere to the location and producing a substantial deflection of the pen 532. The carriage 520 is drilled at 541 to permit fluid between the carriage 520 and the packer 516 to bypass to the other side of the carriage so that the latter may freely slide on the carrier 511. When a leak is encountered by the cup 521 the pen 532 will record a sudden deflection which gradually returns to normal as illustrated at 539 in FIGURE 2.

The chart 533 on which the pen 532 records is driven by a spring motor 542. In order to determine the location corresponding to recorded leaks, a footage printer 543 is provided which prints footage numbers 544 on the chart 533 opposite the point of pen 532. The footage counter 543 is driven by means of a flexible drive cable 534 which passes through a sealed bushing in the housing 511 and engages an edometer wheel 536. Odometer wheel 536 is carried on an arm 537 and spring-pressed against the pipeline wall by means of spring 538. The distance traversed is thus recorded on the drum in known units so that the pressure-difference record is correlated with location.

The apparatus of this invention is launched in the pipeline at the dispatching station through a customary scraper trap and upon entering the pipe is pumped therethrough by the normal movement of the fluid transported by the pipeline. After traversing the pipeline the apparatus is recovered at a scraper trap at the receiving end of the line whereupon the record chart is removed and examined. For the embodiments of FIGURE 2 the pipeline location corresponding to any desired point on the record is easily computed since the traverse distance is directly proportional to the length of record. For the embodiment of FIGURE 1, the pipeline location corresponding to any desired point on the record may also easily be computed. If the pipe is of uniform diameter and the volumetric rate of pumping is uniform, then the distance from the dispatching station to the location corresponding to any desired point on the record bears the same ratio to the total length of traverse as the record time to the desired point bears to the time for the entire traverse. If the chart is driven at a uniform rate then these times are proportional to chart distances.

It is contemplated that prior to running the apparatus disclosed herein, one or more scrapers or other known cleaning devices may be pumped through the pipeline in order to prepare the pipeline for a survey. It is further contemplated that any of the devices shown herein may itself be equipped with one or more scraper sections if such is necessary to obtain a reliable survey. Furthermore, the number of packers used on the instrument carrier may be varied to suit conditions.

What we claim as our invention is:

1. Apparatus for surveying a pipeline for leaks which comprises a vehicle insertable in the pipe, a packer on said vehicle adapted to form a sliding seal against the wall of the pipe, an annular carriage slidably disposed on said vehicle, elastic means connecting said carriage to said vehicle, isolating means on said carriage adapted to isolate a portion of the wall of the pipe and pipe space contiguous thereto, a sealed housing on said vehicle, pressure-difference-responsive means in said housing connected between said space and the space inside the pipe outside said isolating means, and means in said housing recording the indication of said pressure-difference-responsive means.

2. Apparatus for surveying a pipeline for leaks which comprises a vehicle insertable in the pipe, a packer on said vehicle adapted to form a sliding seal against the wall of the pipe, an annular carriage slidably disposed on said vehicle, elastic means connecting said carriage to said vehicle, isolating means on said carriage adapted to isolate a portion of the wall of the pipe and pipe space contiguous thereto, a sealed housing on said vehicle, pressure-difference-responsive means in said housing connected between said space and the space inside the pipe outside said isolating means, time-measuring means in said housing and means in said housing recording the correlation of the indications of said pressure-difference-responsive means and said time measuring means.

3. Apparatus for surveying a pipeline for leaks which comprises a vehicle insertable in the pipe, a packer on said vehicle adapted to form a sliding seal against the wall of the pipe, an annular carriage slidably disposed on said vehicle, elastic means connecting said carriage to said vehicle, isolating means on said carriage adapted to isolate a portion of the wall of the pipe and pipe space contiguous thereto, a sealed housing on said vehicle, pressure-difference-responsive means in said housing connected between said space and the space inside the pipe outside said isolating means, distance-measuring means in said housing, and means in said housing recording the correlation of the indications of said pressure-difference-responsive means and said distance measuring means.

References Cited in the file of this patent
UNITED STATES PATENTS

| | | |
|---|---|---|
| 2,701,960 | Irwin | Feb. 15, 1955 |
| 2,782,370 | Ver Nooy | Feb. 19, 1957 |